United States Patent
Yoo et al.

(10) Patent No.: US 8,181,193 B2
(45) Date of Patent: May 15, 2012

(54) DISK CHUCKING DEVICE FOR ALIGNMENT OF THE ROTATIONAL CENTER OF A DISK WITH THE CENTER OF THE DISK CHUCKING DEVICE

(75) Inventors: Young-Sun Yoo, Suwon-si (KR); Yeol Choi, Gwangmyeong-si (KR); Pyo Kim, Suwon-si (KR); Kyung-Seob Shin, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 279 days.

(21) Appl. No.: 12/501,815

(22) Filed: Jul. 13, 2009

(65) Prior Publication Data

US 2010/0153978 A1 Jun. 17, 2010

(30) Foreign Application Priority Data

Dec. 15, 2008 (KR) ........................ 10-2008-0127484

(51) Int. Cl.
*G11B 17/03* (2006.01)
(52) U.S. Cl. ........................................................ 720/707
(58) Field of Classification Search .................. 720/703, 720/704, 707, 708, 709
See application file for complete search history.

(56) References Cited

U.S. PATENT DOCUMENTS

| | | | | |
|---|---|---|---|---|
| 4,562,570 A * | 12/1985 | Denton | ........................ | 720/709 |
| 5,166,920 A * | 11/1992 | Kogure | ........................ | 720/707 |
| 5,323,379 A * | 6/1994 | Kim | ........................ | 720/707 |
| 5,379,287 A * | 1/1995 | Heinrich | ........................ | 720/709 |
| 5,637,200 A * | 6/1997 | Tsymberov | ............... | 204/298.15 |
| 5,956,315 A * | 9/1999 | Sawai et al. | ................... | 720/708 |
| 6,208,613 B1 * | 3/2001 | Iizuka | ........................ | 720/707 |
| 6,252,319 B1 * | 6/2001 | Sudo et al. | ................. | 310/67 R |
| 6,363,048 B1 * | 3/2002 | Wu et al. | ................... | 720/707 |
| 6,421,312 B1 * | 7/2002 | Liao et al. | ................... | 720/707 |
| 6,487,162 B1 * | 11/2002 | Wu et al. | ................... | 720/708 |
| 6,611,490 B1 * | 8/2003 | Bierhoff | .................... | 720/707 |

(Continued)

FOREIGN PATENT DOCUMENTS

JP 2000030328 A * 1/2000

(Continued)

OTHER PUBLICATIONS

Partial computer English translation of JP 2004-213812, 10 pages.*

(Continued)

*Primary Examiner* — Brian Miller
(74) *Attorney, Agent, or Firm* — McDermott Will & Emery LLP (57) ABSTRACT

A disk chucking device is disclosed. In accordance with an embodiment of the present invention, the disk chucking device coupling a disk to a rotor of a motor such that the disk can be mounted and demounted can include a boss, which is coupled with the rotor, a first elastic body, which includes an inner circumference surrounding the boss and in which the first elastic body has elasticity in a radial direction from a center of the boss, a plurality of second elastic bodies, which are radially disposed from the first elastic body and in which the plurality of second elastic bodies are elastically supported by the first elastic body, and a plurality of chuck pins, which press the disk and in which each of the plurality of chuck pins is elastically supported by each of the plurality of second elastic bodies.

4 Claims, 6 Drawing Sheets

U.S. PATENT DOCUMENTS

| | | | |
|---|---|---|---|
| 6,826,771 B1 * | 11/2004 | Wada | 720/707 |
| 6,868,549 B2 * | 3/2005 | Watanabe et al. | 720/715 |
| 6,908,086 B2 * | 6/2005 | Rall | 279/43.7 |
| 6,957,443 B2 * | 10/2005 | Horng et al. | 720/707 |
| 6,961,949 B2 * | 11/2005 | Horng et al. | 720/695 |
| 7,308,694 B2 * | 12/2007 | Someno | 720/696 |
| 7,480,927 B2 * | 1/2009 | Oota | 720/707 |
| 7,581,235 B2 * | 8/2009 | Oota | 720/707 |
| 7,802,273 B2 * | 9/2010 | Kim et al. | 720/709 |
| 2005/0081229 A1 * | 4/2005 | Shibata | 720/709 |
| 2005/0108743 A1 * | 5/2005 | Kawamura | 720/708 |
| 2006/0031866 A1 * | 2/2006 | Kim et al. | 720/706 |
| 2006/0048176 A1 * | 3/2006 | Choi et al. | 720/707 |
| 2007/0200465 A1 * | 8/2007 | Shiga | 310/67 R |
| 2011/0131592 A1 * | 6/2011 | Kim et al. | 720/707 |
| 2011/0321068 A1 * | 12/2011 | Park et al. | 720/704 |

FOREIGN PATENT DOCUMENTS

| | | | |
|---|---|---|---|
| JP | 2001273695 A | * | 10/2001 |
| JP | 2002208202 A | * | 7/2002 |
| JP | 2002237118 A | * | 8/2002 |
| JP | 2004199830 A | * | 7/2004 |
| JP | 2004213812 A | * | 7/2004 |
| JP | 2006-120300 | | 5/2006 |
| KR | 10-2006-0020933 | | 3/2006 |

OTHER PUBLICATIONS

Korean Office Action, w/ partial English translation thereof, issued in Korean Patent Application No. 10-2008-0127484 dated Jan. 29, 2010.

Japanese Office Action, w/ English translation thereof, issued in Japanese Patent Application No. 2009-173710, dated Oct. 4, 2011.

* cited by examiner

DISK CHUCKING DEVICE FOR ALIGNMENT OF THE ROTATIONAL CENTER OF A DISK WITH THE CENTER OF THE DISK CHUCKING DEVICE

CROSS-REFERENCE TO RELATED APPLICATIONS

This application claims the benefit of Korean Patent Application No. 10-2008-0127484, filed with the Korean Intellectual Property Office on Dec. 15, 2008, the disclosure of which is incorporated herein by reference in its entirety.

BACKGROUND

1. Technical Field

The present invention relates to a disk chucking device.

2. Description of the Related Art

Generally, a disk driving device includes a disk chucking device for loading or unloading a disk and a spindle motor for rotating the disk, which is loaded by the disk chucking device, at a certain speed.

An important consideration for the disk driving device is a perfect alignment of the center of the disk chucking device and the rotational center of the disk mounted on the chucking device. If the center of the disk chucking device and the rotational center of the disk are not properly aligned, the high-speed rotation of the disk may further deviate the centers, causing vibration and noise.

Figure 1:
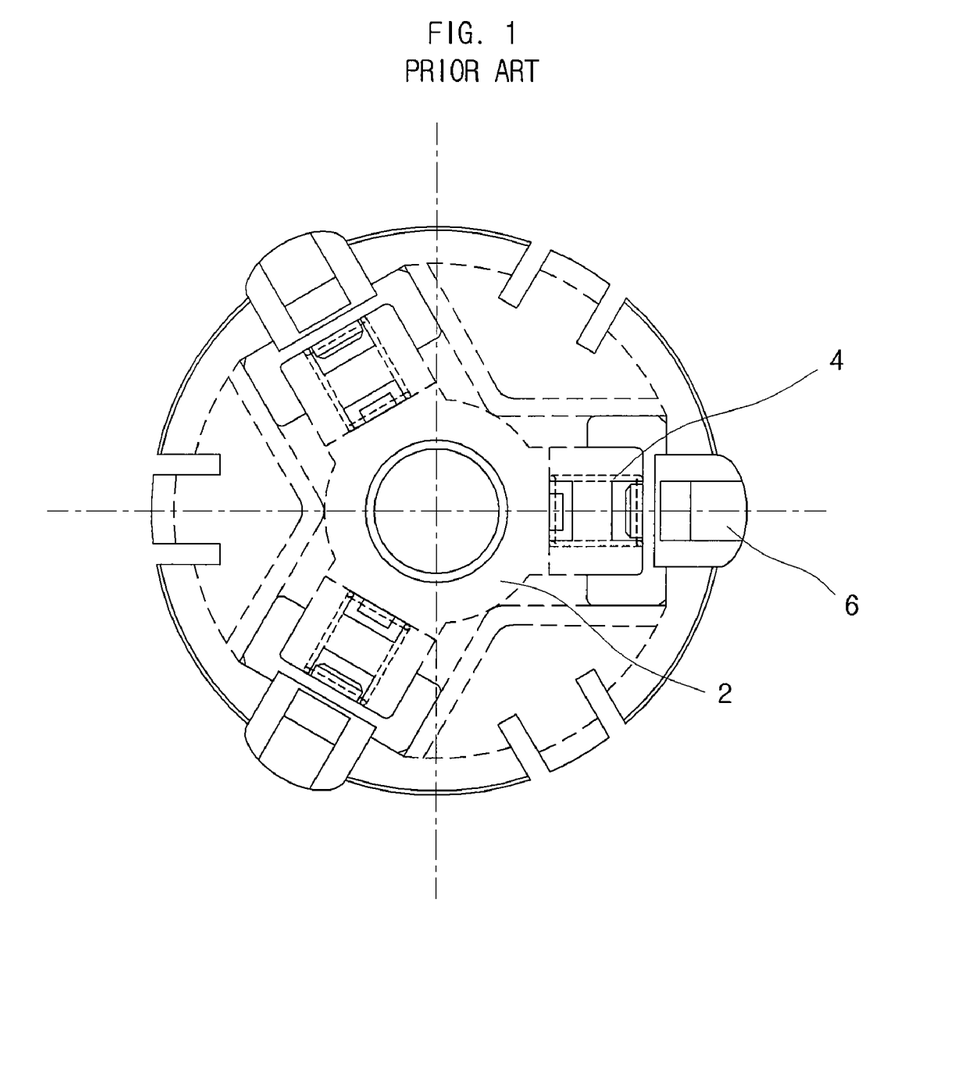
FIG. 1 is a plan view illustrating a disk chucking device in accordance with the related art.

FIG. 1 is a plan view illustrating a disk chucking device according to the related art. As shown in FIG. 1, a coil spring 4, which supports a chuck pin 6 elastically, is disposed in the radial direction of the conventional disk chucking device.

Here, each chuck pin 6 is supported by the coil spring 4 individually. Accordingly, if the center of the disk chucking device and the rotational center of the disk are misaligned because of a change in elasticity of the coil spring 4, a difference in gap between each chuck pin 6 and a central boss 2, etc., it may not be possible to compensate for the misalignment of the center of the disk chucking device and the rotational center of the disk.

If the length of the coil spring 4 is not enough due to the limited distance between the chuck pin 6 and the central boss 2, the coil spring 4 may not have a constant force against the same displacement. As a result, the chuck pin 6 may not be able to support the inner circumference of the disk with a constant force, and may cause a misalignment of the center of the disk chucking device and the rotational center of the disk.

If these centers are not properly aligned, information may not be written and/or read properly.

SUMMARY

The present invention provides a disk chucking device in which the center of a disk is better aligned.

An aspect of the present invention provides a disk chucking device. In accordance with an embodiment of the present invention, the disk chucking device coupling a disk to a rotor of a motor such that the disk can be mounted and demounted can include a boss, which is coupled with the rotor, a first elastic body, which includes an inner circumference surrounding the boss and in which the first elastic body has elasticity in a radial direction from a center of the boss, a plurality of second elastic bodies, which are radially disposed from the first elastic body and in which the plurality of second elastic bodies are elastically supported by the first elastic body, and a plurality of chuck pins, which press the disk and in which each of the plurality of chuck pins is elastically supported by each of the plurality of second elastic bodies.

The disk chucking device can further include a supporting part, which supports the first elastic body.

The supporting part can be interposed among the plurality of second elastic bodies and support the inner circumference of the first elastic body.

The supporting part can be shaped like a protrusion being protruded in a radial direction from the boss.

The supporting part can be interposed among the plurality of second elastic bodies and support an outer circumference of the first elastic body.

The first elastic body can include a leaf spring surrounding the boss.

Additional aspects and advantages of the present invention will be set forth in part in the description which follows, and in part will be obvious from the description, or may be learned by practice of the invention.

DETAILED DESCRIPTION

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first" and "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

A disk chucking device according to certain embodiments of the present invention will be described below in more detail with reference to the accompanying drawings. Those components that are the same or are in correspondence are rendered the same reference numeral regardless of the figure number, and redundant descriptions are omitted.

Figure 2:
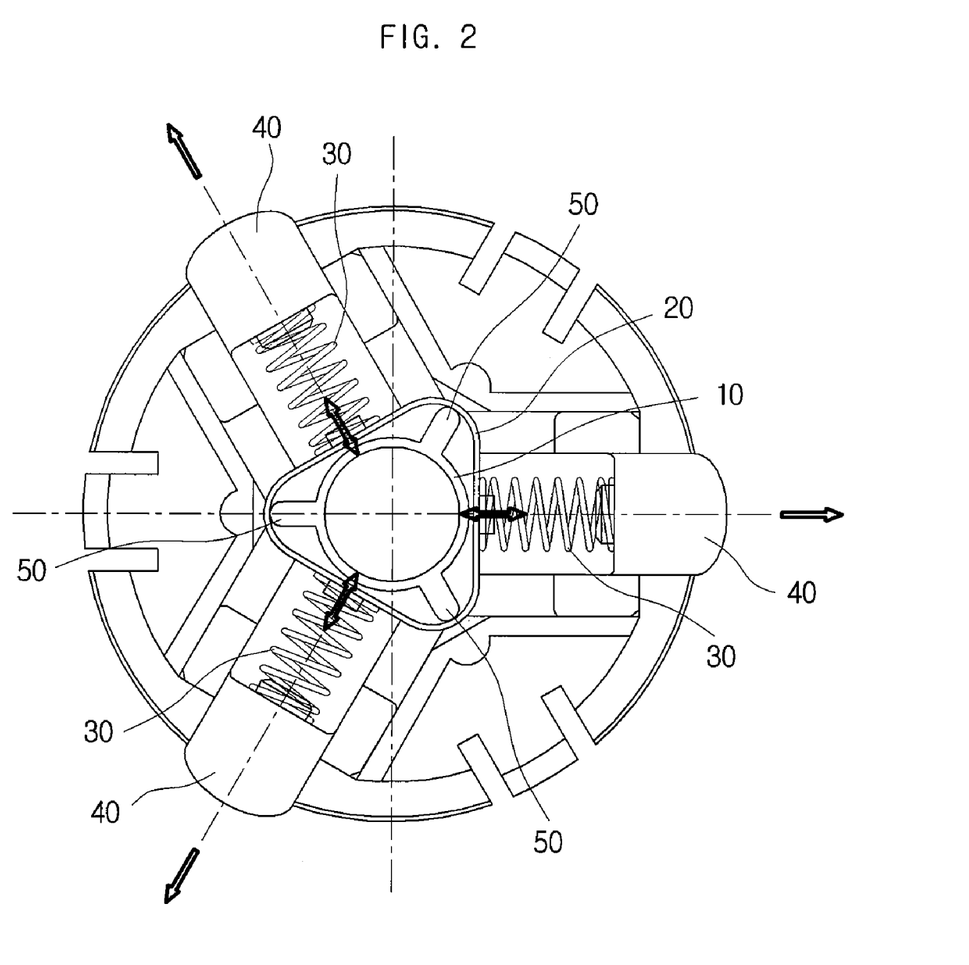
FIG. 2 is a plan view illustrating a disk chucking device in accordance with a first embodiment of the present invention.
Figure 3:
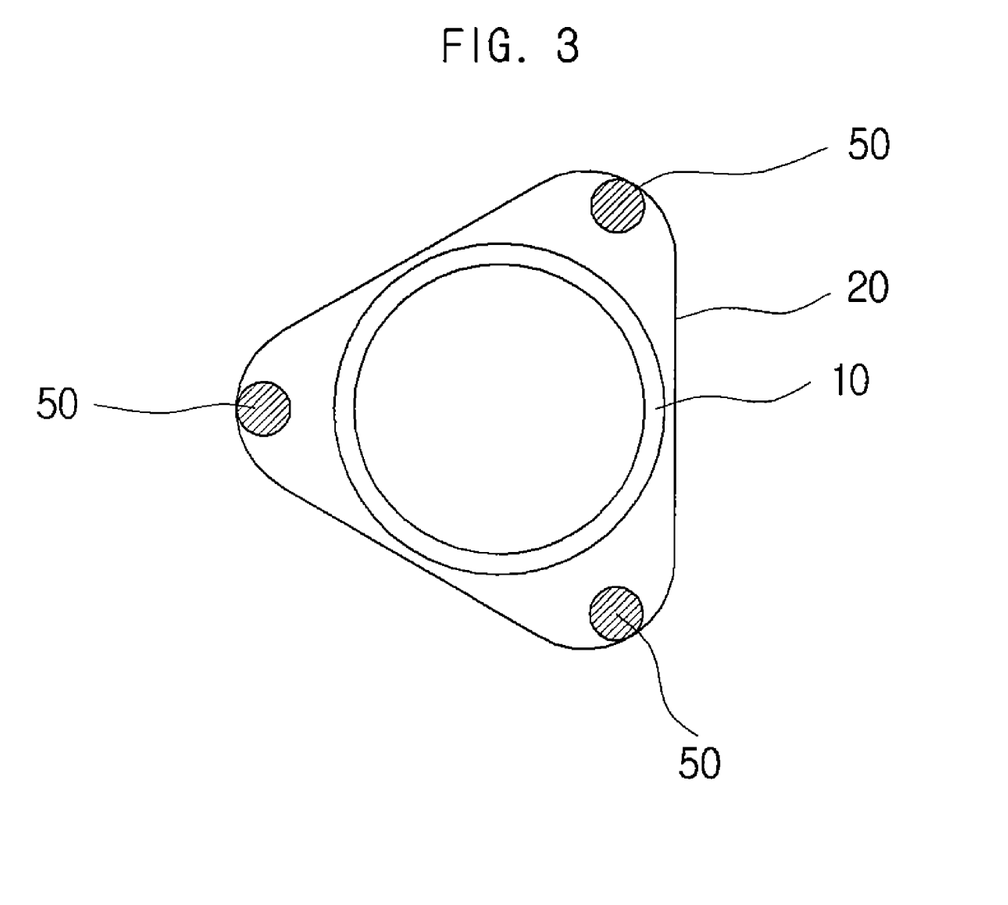
FIG. 3 is a plan view illustrating a first elastic body of a disk chucking device in accordance with a second embodiment of the present invention.

FIG. 2 is a plan view illustrating a disk chucking device in accordance with a first embodiment of the present invention, and FIG. 3 is a plan view illustrating a first elastic body of a disk chucking device in accordance with a second embodiment of the present invention.

Illustrated in FIGS. 2 and 3 are a boss 10, a first elastic body 20, a second elastic body 30, a chuck pin 40 and a supporting part 50.

In accordance with a first embodiment of the present invention, a disk chucking device, which couples a disk to a rotor of a motor such that the disk can be mounted and demounted, includes a boss 10, which is coupled with the rotor, a first elastic body 20, which has elasticity in a radial direction from a center of the boss 10 and in which an inner circumference of the first elastic body 20 surrounds the boss 10, a plurality of second elastic bodies 30, which are radially disposed from the first elastic body 20 and in which the plurality of second elastic bodies 30 are elastically supported by the first elastic body 20, and a plurality of chuck pins 40, which press the disk and each of which is elastically supported by each of the plurality of second elastic bodies 30. According to the disk chucking device based on the first embodiment of the present invention, the center of the disk can be better aligned by providing a uniform elastic force to each of the chuck pins 40.

The boss 10 is coupled with the rotor, which is a rotating part of a spindle motor, such that the disk chucking device rotates. Since the boss 10 is coupled to the center of a housing, in which the components of the disk chucking device are assembled, the disk chucking device can be rotated by the rotor. In order to align the rotational center of the disk and the center of the disk chucking device, the rotor's rotational axis is aligned with the center of the boss 10.

Referring to FIG. 1, in the present embodiment, a through-hole, into which the rotational axis of the rotor is inserted, can be formed in the center of the boss 10, and the boss 10 can be formed in a single body with the housing. As a result, the disk chucking device can be rotated by the rotational axis being inserted into and coupled to the through-hole.

The first elastic body 20 and the second elastic body 30 can provide an elastic force to the chuck pin 40. Then, the plurality of second elastic bodies 30 are elastically integrated such that each of the plurality of second elastic bodies 30 can organically support each of the chuck pins 40. To do this, the first elastic body 20 is formed, surrounding the boss 10 such that all the second elastic bodies 30 are supported by the first elastic body 20. Additionally, the first elastic body 20 is radially formed from the center of the boss 10 to provide an elastic force to the chuck pin 40.

Particularly, with reference to FIG. 2, an elastic frame, i.e., a leaf spring, surrounding the boss 10 can be used as the first elastic body 20 of the present embodiment. From the leaf spring in the middle, the plurality of second elastic bodies 30, i.e., coil springs, are elastically integrated by being supported by the first elastic body 20. This will be described later.

The second elastic body 30 is interposed between the first elastic body 20 and the chuck pin 40 such that the chuck pin 40 can be elastically supported. Here, the second elastic body 30 is disposed in the radial direction of the boss 10 such that an inner circumference of the disk is evenly pressed by the chuck pin 40. Moreover, as described above, each of the second elastic bodies 30 is organically operated with other second elastic bodies 30 by being supported by the first elastic body 20.

Particularly, with reference to FIG. 2, the second elastic body 30, which is a coil spring, is supported by the leaf spring surrounding the boss 10 and supports the chuck pin 40 toward the inner circumference of the disk in the radial direction of the boss 10. Here, each of the coil springs is elastically integrated by the leaf spring. Hereinafter, this will be described in detail.

Figure 5:
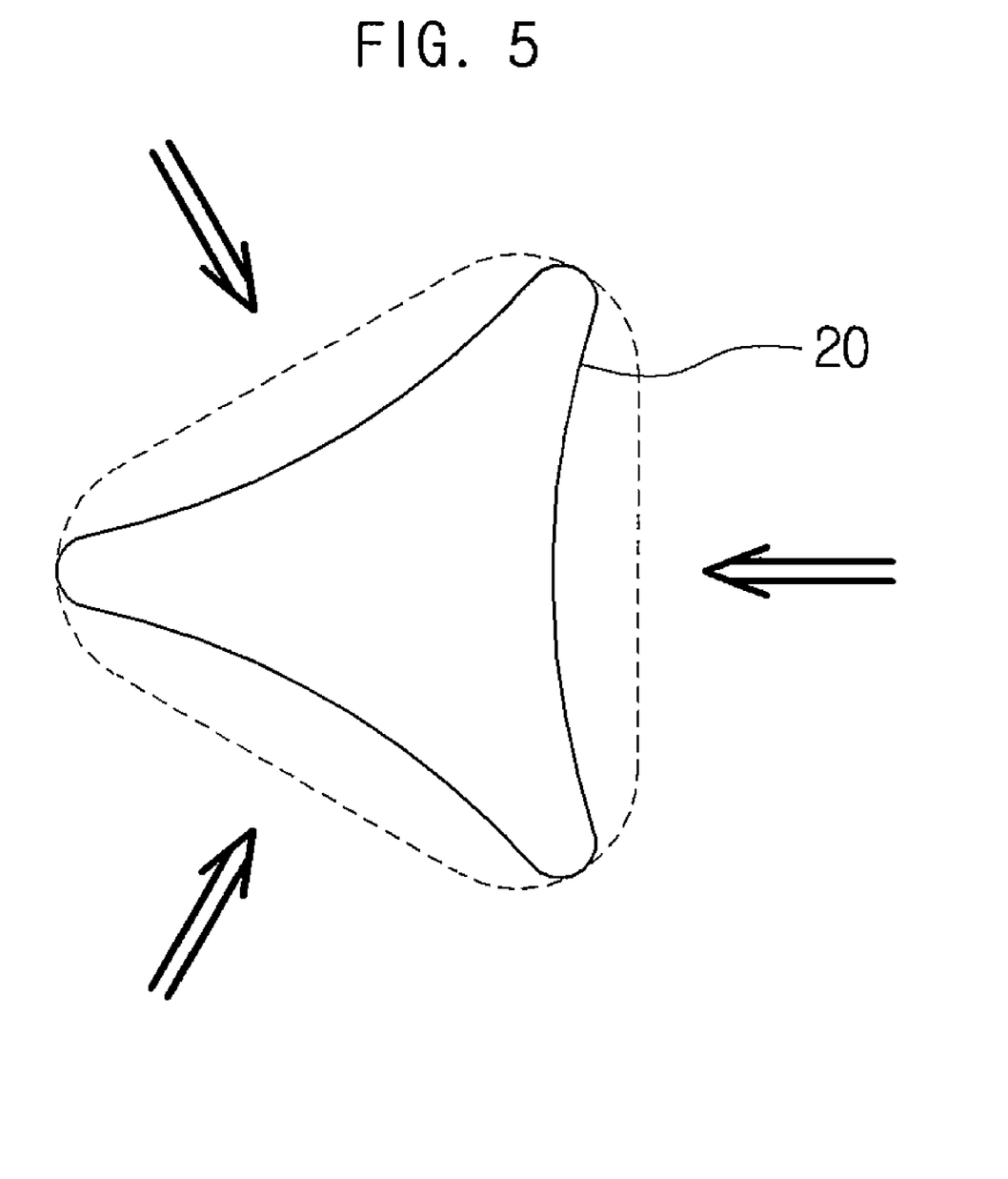
FIGS. 5 and 6 are a plan view illustrating the operation of a first elastic body of a disk chucking device in accordance with the first embodiment of the present invention.
Figure 6:
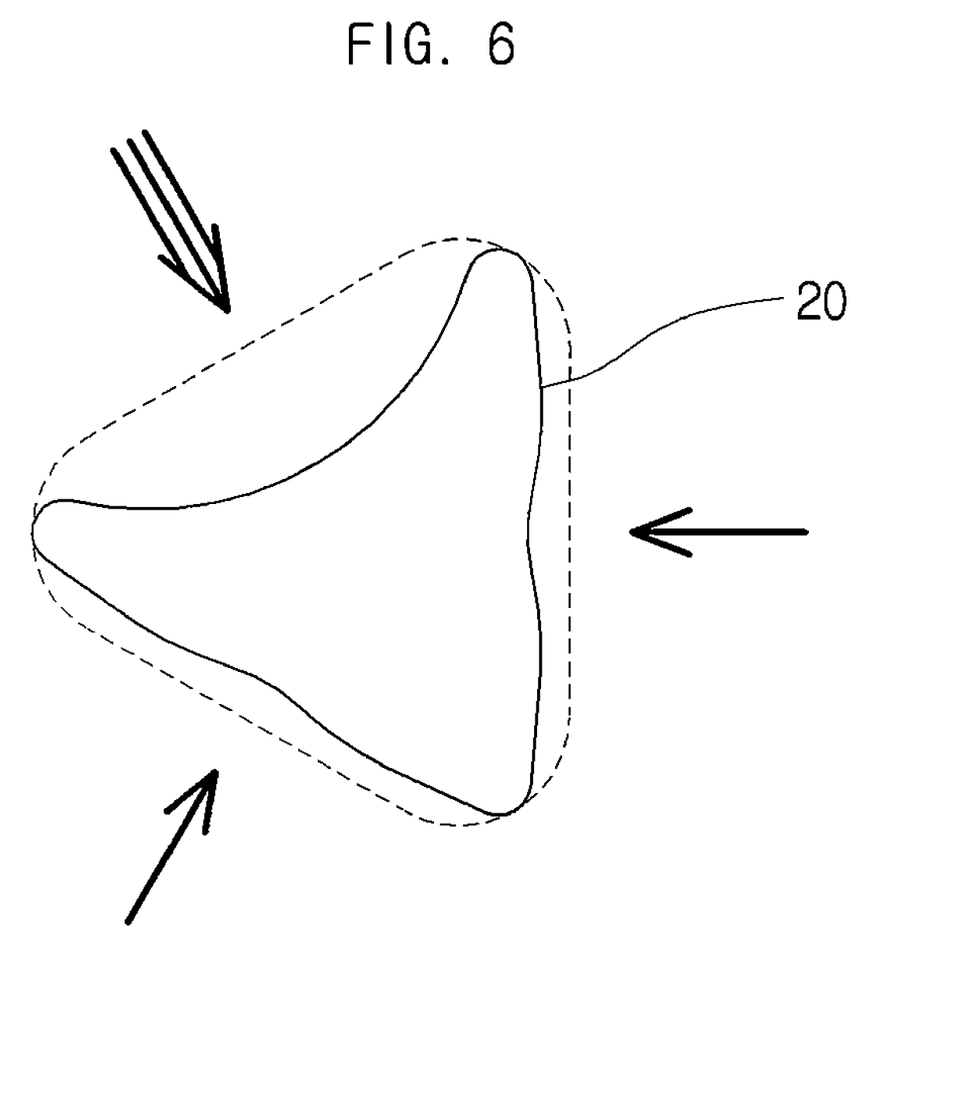

FIGS. 5 and 6 are plan views illustrating the operation of a first elastic body of the disk chucking device in accordance with the first embodiment of the present invention.

As illustrated in FIG. 5, when the first elastic body 20 is pressed by each of the second elastic bodies 30 with a uniform force, a supporting surface of the first elastic body 20, in which each of the second elastic bodies 30 is supported by the supporting surface of the first elastic body 20, is also uniformly deformed, generating equal resistance, i.e., an elastic force.

As illustrated in FIG. 6, however, when a force applied to one side of the first elastic body 20 by one of the second elastic bodies 30 is greater than other forces applied by other second elastic bodies 30, the first elastic body 20 of a side to which a greater force is applied is deformed so as to be pushed further inside. Then, the second elastic body 30 applying the greater force is relatively decompressed, and other second elastic bodies 30 are relatively compressed. As a result, each of the second elastic bodies 30 applies an uniform force to the first elastic body 20 to bounce back. That is, the second elastic bodies 30 pressing the chuck pin 40 have equal forces. Therefore, the plurality of second elastic bodies 30 supported by the first elastic body 20 can be organically operated and support the plurality of chuck pins 40 with uniform forces, and thus the plurality of chuck pins 40 can press the inner circumference of the disk with uniform forces, preventing the eccentric alignment of the center of the disk and the rotational center of the disk mounted on the chucking device.

Meanwhile, the chucking device can further include the supporting part 50 supporting the first elastic body 20 such that the first elastic body 20 can firmly support the plurality of second elastic bodies 30. Here, with reference to FIG. 3, the supporting part 50 can be formed among the second elastic bodies 30 such that the supporting part 50 supports the inner circumference of the first elastic body 20. Then, each of the second elastic bodies 30 can be steadily supported by a flat surface which is astride the supporting part 50. Particularly, as illustrated in FIG. 2, the supporting part 50 can be shaped like a protrusion being protruded in the radial direction of the boss 10 and integrated with the boss 10.

Figure 4:
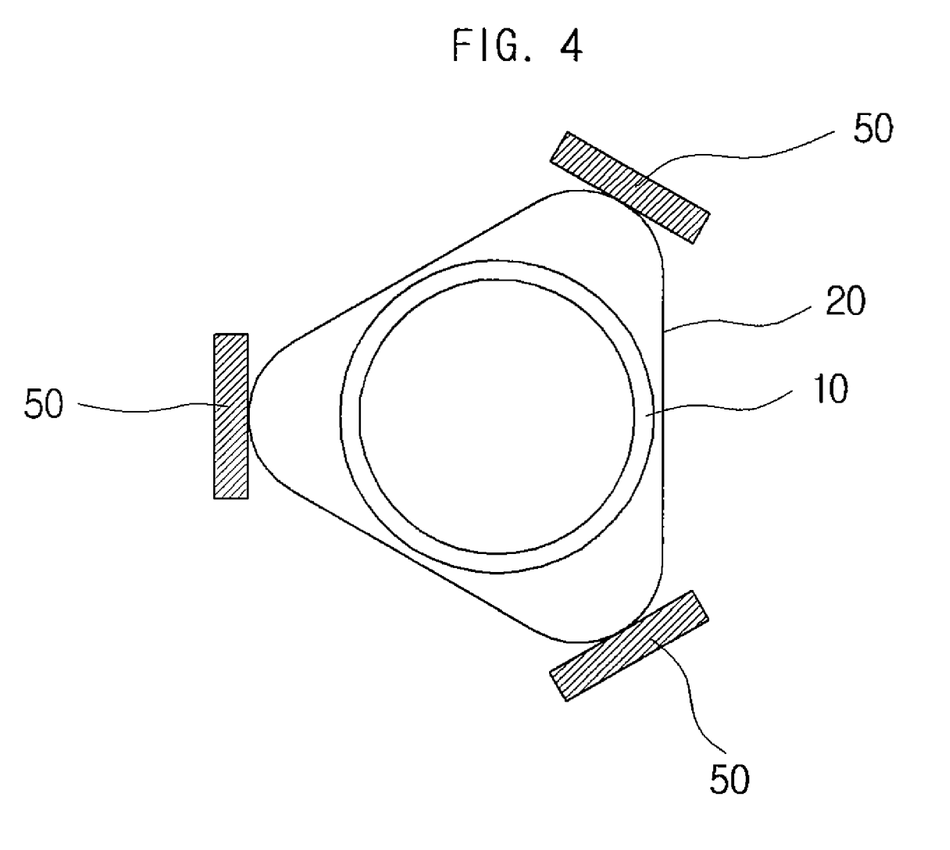
FIG. 4 is a plan view illustrating a first elastic body of a disk chucking device in accordance with a third embodiment of the present invention.

Additionally, with reference to FIG. 4, the supporting part 50 can support the first elastic body 20 having certain strength by pressing the outer circumference of the first elastic body 20 at certain intervals. Here, the supporting part 50 can be placed among the second elastic bodies 30 such that the supporting part 50 can support both sides of the first elastic body 20 supporting the second elastic body 30. Therefore, the first elastic body 20 can firmly support the second elastic body 30.

While the spirit of the invention has been described in detail with reference to particular embodiments, the embodiments are for illustrative purposes only and shall not limit the invention. It is to be appreciated that those skilled in the art can change or modify the embodiments without departing from the scope and spirit of the invention. As such, many embodiments other than those set forth above can be found in the appended claims.

What is claimed is:

1. A disk chucking device for aligning a rotational center of a disk to a rotor of a motor such that the disk can be mounted and demounted, the disk chucking device comprising:

a boss being coupled with the rotor;

a first elastic body comprising a leaf spring which has an inner circumference surrounding the boss, the first elastic body having elasticity in a radial direction from a center of the boss;

a plurality of second elastic bodies radially disposed from the first elastic body, the plurality of second elastic bodies being elastically supported by the first elastic body;

a plurality of chuck pins configured to press the disk, each of the plurality of chuck pins being elastically supported by each of the plurality of second elastic bodies; and a plurality of supporting parts configured to support the first elastic body, wherein the supporting parts are: interposed among the plurality of second elastic bodies, placed alternately with respect to the plurality of second elastic bodies, and support a circumference of the first elastic body.

2. The disk chucking device of claim 1, wherein the supporting part is pillar shaped.

3. The disk chucking device of claim 2, wherein the supporting part protrudes in a radial direction from the boss to be interposed among the plurality of second elastic bodies and to support the inner circumference of the first elastic body.

4. The disk chucking device of claim 1, wherein the supporting part is interposed among the plurality of second elastic bodies and supports an outer circumference of the first elastic body.

* * * * *